(12) United States Patent
King

(10) Patent No.: US 6,731,211 B1
(45) Date of Patent: May 4, 2004

(54) KEY CONTROL TAG

(76) Inventor: Micheal A. King, 1579 W. Lawrence La., Phoenix, AZ (US) 85021-4333

( * ) Notice: Subject to any disclaimer, the term of this patent is extended or adjusted under 35 U.S.C. 154(b) by 0 days.

(21) Appl. No.: 10/299,899

(22) Filed: Nov. 20, 2002

(51) Int. Cl.[7] .............................................. G08B 13/14
(52) U.S. Cl. ..................... 340/568.1; 340/570; 340/5.6; 70/456 R
(58) Field of Search .......................... 340/568.1, 568.2, 340/570, 571, 825.49, 825.36, 5.6, 5.65, 5.66, 5.73; 40/330; 235/375; 70/456 R, 456 B, 448, 460

(56) References Cited

U.S. PATENT DOCUMENTS

| | | | | |
|---|---|---|---|---|
| 4,521,981 | A | * | 6/1985 | Kasprzycki et al. .......... 40/2 A |
| D300,835 | S | * | 4/1989 | Stevens ........................ D20/27 |
| D310,849 | S | * | 9/1990 | Davis ........................... D20/27 |
| 5,801,628 | A | * | 9/1998 | Maloney .................. 340/568.1 |
| D413,828 | S | * | 9/1999 | Hogan et al. .............. D10/104 |
| 6,075,441 | A | * | 6/2000 | Maloney .................. 340/568.1 |
| 6,195,005 | B1 | * | 2/2001 | Maloney .................. 340/568.1 |
| 6,262,664 | B1 | * | 7/2001 | Maloney .................. 340/572.8 |
| 6,317,044 | B1 | * | 11/2001 | Maloney .................. 340/568.1 |
| D456,852 | S | * | 5/2002 | Maloney ...................... D20/22 |
| 6,431,438 | B1 | * | 8/2002 | Pires et al. .................. 235/375 |
| 6,501,379 | B2 | * | 12/2002 | Maloney .................. 340/568.1 |
| 2002/0044055 | A1 | * | 4/2002 | Maloney ........................ 340/571 |
| 2002/0113706 | A1 | * | 8/2002 | Prado et al. ................. 340/571 |

FOREIGN PATENT DOCUMENTS

WO          WO 01/19612        *   3/2001

* cited by examiner

*Primary Examiner*—Toan N. Pham
(74) *Attorney, Agent, or Firm*—Richard C. Litman

(57) ABSTRACT

A key control tag is configured for use with the Key-Trak, Inc. key control system, and provides several advantages over the conventional tags of that system. A problem with the Key-Trak, Inc. system, is that electrically conductive objects (keys, paper clips, staples, etc.) can fall into the slots in the drawer of the device, shorting out the electrical contacts within the slots and causing costly damage to the system. The present key control tag includes a laterally extending flange which covers the gap or space between the side of the tag and the edge of the slot, thereby precluding entry of foreign objects into the slot. The present invention also includes a blank embodiment for covering otherwise unused slots. The present tags are also formed of somewhat thicker and stiffer material than the Key-Trak, Inc. tags, reducing bending of the tags when multiple keys or massive objects are attached thereto.

20 Claims, 3 Drawing Sheets

KEY CONTROL TAG

BACKGROUND OF THE INVENTION

1. Field of the Invention

The present invention relates generally to security systems, and more particularly to a key control system incorporating a series of key tags. The tags each include an electronic devices which is inserted in a reader slot, which determines whether the key tag is installed in the slot, times of removal and replacement, etc. The present tag uses existing prior art electronic devices and reader mechanisms, but incorporates many improvements over earlier prior art key tags, particularly in precluding entry of foreign objects into the slots of the device and resultant damage.

2. Description of the Related Art

An ongoing problem in many industries or fields, is the tracking and security of keys and/or similar articles which are used by employees or others. While this is not generally a problem for a relatively small number of keys, the tracking of a larger number of keys adds to the difficulty of the task, and increases the opportunity for error or abuse of the system. Examples of industries where this problem exists, are auto sales and rental operations where keys to a large number of vehicles must be tracked and secured, large apartment or storage rental facilities, etc.

Accordingly, various solutions have been proposed for this problem. An example of such is the system developed by Key-Trak, Inc., of Ovieda, Fla., which provides a master drawer system which is accessible by a master key, copies of which are held by only a very few authorized persons. The master drawer in turn includes a relatively large number of key tag slots therein, providing for the selective placement of corresponding key tags in each of the slots. Each key tag includes a key attached to one end, and an electronic device secured to the opposite end of the tag. The key tag drawer is connected to a reader system, which determines specifically which key tag(s) and its associated key(s) is/are removed from the drawer, the times of removal and replacement of the tag(s), and perhaps other pertinent information.

This system has helped immensely in reducing key loss, misuse and abuse of the system and associated vehicles, and other problems which may arise when control of a relatively large number of keys is an issue. However, the Key-Trak system is not perfect. The key tags which are used with the Key-Trak system are relatively simple devices, and can create problems with the Key-Trak drawer system. For example, the drawer slots must by necessity have a relatively wide portion, to provide clearance for the thickness of the electronic device installed in the end of the tag. This can allow key and other foreign objects to pass into that or an adjacent slot(s) as well, where they can engage the electrical contacts within the drawer and cause reader errors, damage the system by shorting out the reader contacts, etc.

The present invention responds to this problem by providing an improved key tag which includes a lateral flange or stop disposed above the electronic tracking device installed in one end of the tag. This stop or flange serves to cover the slot into which the tag is inserted, thereby precluding entrance of the attached key (or any other article) into that or other slot(s), and assuring that the electrical contacts within the slot(s) will not be bridged by any electrically conductive device(s) other than the electronic chip or button installed in the end of the tag. The present tag is formed of a heavier gauge and of a more durable plastic material than tags of the prior art used conventionally with the Key-Trak system, with the present tags having greater durability and more resistance to breakage than the conventional Key-Trak tags.

A discussion of the related art of which the present inventors is aware, and its differences and distinctions from the present invention, is provided below.

U.S. Pat. No. 4,521,981 issued on Jun. 11, 1985 to Robert Kasprzycki et al., titled "Key Holder," describes a flat, rectangular tag having relatively thickened, inwardly turned edges to retain a card or the like therein. A slot is provided through one of the edges, for the attachment of a key or keychain therethrough. The Kasprzycki et al. key holder is not adaptable for use with a key tag reading and tracking device, as (a) no passage for the installation of an electronic device is provided, and (b) the relatively thick edges of the Kasprzycki et al. tag, would preclude its insertion into a slot of a tag tracking device.

U.S. Pat. No. 5,801,628 issued on Sep. 1, 1998 to William C. Maloney, titled "Inventoriable-Object Control And Tracking System," describes the key tracking and control system with which the present improved key tag is used, which disclosure is incorporated herein by reference. The Maloney system comprises a drawer having a horizontal panel, with a series of key tag slots in the panel. Each slot has a pair of electrical contacts therein, which communicate with a computer system. A series of key tags are provided, with each having an electronic button or chip installed opposite the key attachment end. A key is secured to each tag in use, with the computer tracking which tag and key correspond to which slot. When the tag is removed so the key can be used, the computer registers the withdrawal of the corresponding electronics device from the slot, thereby logging out the key. When the key is returned, the device registers the insertion of the electronic device within the slot, and logs the key return. This system works well, with some exceptions. One major problem with this system is that the key tags are formed of thin plastic of uniform thickness. As noted above, the necessity of relatively wide clearance areas in the drawer slots for the electronic devices in the ends of the tags, results in spaces or gaps between the edges of the slots and the sides of the tags. Keys attached to the tags, or other articles, can pass into these gaps, and short out or otherwise interfere with the electronic signal from the buttons or chips. The present tag obviates this problem, by means of the lateral flange between the electronic device and key attachment ends.

U.S. Pat. No. 6,075,441 issued on Jun. 13, 2000 to William C. Maloney, titled "Inventoriable-Object Control And Tracking System," is a continuation-in-part based upon the '628 U.S. Patent to the same inventor, discussed immediately above. The specifications of the two Maloney U.S. Patens are essentially identical to one another, with some slight formatting differences between the two. Only the claims differ significantly between the two patents. Accordingly, the discussion of the parent '628 U.S. Patent provided immediately above, is seen to apply here as well.

U.S. Pat. No. 6,262,664 issued on Jul. 17, 2001 to William C. Maloney, titled "Tamper Detection Prevention For An Object Control And Tracking System," describes a somewhat different type of key tag device than that disclosed in his earlier '628 and '441 U.S. Patents, discussed above. The key tag device of the Maloney '664 U.S. Patent includes a generally U-shaped cable or tether having its ends attached to the key tag device. The key is captured along the length of the tether. The key tag includes means for detecting any breakage or discontinuity in the tether, thereby alerting the system if the tether is cut for removal of the key. This system may also operate when the key tag is removed from the storage drawer, by means of RF (radio frequency) or similar signals. However, no means is apparent to preclude the dropping or inadvertent insertion of the conductive key in to the corresponding slot in the storage drawer, and the problems associated with such an occurrence as noted further above. The present key tag, with its lateral flange, solves this problem.

U.S. Patent Application Publication No. 2002/44,055 published on Apr. 18, 2002 to William C. Maloney, titled "Object Carriers For An Object Control And Tracking System," describes an alternate security container device for use with the key control security drawer of the Maloney '628 and '441 U.S. Patents, discussed further above. The security container of the '055 Patent Application Publication comprises a lockable box having a slot in the bottom, in which a key control tag may be placed. Any keys or other articles secured to the tag are secured within the box, with the opposite distal end of the tag, which contains an electronic chip or the like therein, extending from the slot in the box. This allows the box and key tag assembly to be used with the earlier developed key control drawers, while providing security for relatively bulky objects such as medications, jewelry, etc. While the box structure of the Maloney '055 Patent Application Publication does preclude the dropping or falling of keys and other conductive objects into the slots of the key control drawer, they box covers a considerable number of slots which would otherwise be available for use with conventional key tags, or with the key tags of the present invention. The present key tags are a much more efficient means of using the Key-Trak drawer system, or a similar system, for key storage, while also precluding entry of keys and other metallic objects into the slots of the drawers.

U.S. patent application Publication Ser. No. 2002/113,706 published on Aug. 22, 2002 to Ronald J. Prado et al., titled "Object Storage And Tracking System, An Object Tracking Unit And A Container For Object Tracking Units," describes a key control system which serves the same purpose as the system described in the Maloney '628 and '441 U.S. Patents, discussed further above. However, the Prado et al. system differs structurally, in that it has a series of sockets into which mating key control plugs may be removably installed, with each of the plugs having a key ring extending therefrom for the attachment of one or more keys thereto. The generally cylindrical sockets into which the Prado et al. key control plugs insert, appear to be about equally susceptible to having keys or other foreign objects fall therein, and Prado et al. fail to provide any means to prevent this from happening.

U.S. Pat. No. D-300,835 issued on Apr. 25, 1989 to Charles P. Stevens, titled "Display Tag," illustrates a design having a similar appearance to the key holder of the Kasprzycki et al. '981 U.S. Patent, discussed further above. The same points noted in that discussion, are seen to apply here as well.

U.S. Pat. No. D-310,849 issued on Sep. 25, 1990 to Jeffrey B. Davis, titled "Medical Information Tag," illustrates a design having a "window within a window" configuration. The Davis tag is an essentially flat card providing for the display of two different sets of information thereon. No lateral flange or stop is provided, as Davis does not disclose the use of his tag with a key control system having a series of tag insertion slots therein.

U.S. Pat. No. D-413,828 issued on Sep. 14, 1999 to Dennis L. Hogan et al., titled "Electronically Detectable Tag With Clamp And Clutch Locking Mechanism," illustrates a design which appears to be intended as a retail security device. No means for securing a key to the Hogan et al. tag, is apparent from the drawings of the '828 Design Patent.

U.S. Pat. No. D-456,852 issued on May 7, 2002 to William C. Maloney, titled "Key Tag," illustrates a design for the key tag disclosed in FIGS. 12 and 13 of the '628 and '441 U.S. Utility Patents to the same inventor, both of which have been discussed further above. The very thin structure of the Maloney key tag, with its relatively thicker electronic button attachment, is shown clearly in these U.S. Patents. The need to provide sufficient slot, width in the storage drawer for clearance for the electronic button, is obvious in consideration of the side or edge view of the Maloney key tag in the above noted references. However, the Maloney tag fails to provide any coverage to preclude entrance of foreign objects into the otherwise uncovered slots, and the resultant damage to the system which can occur when this happens. The present key control tag provides a lateral flange or stop which extends outwardly from the surface of the tag to cover the slots when the tag is inserted therein, thereby precluding entrance of foreign objects into the slots. A blank embodiment to close any otherwise empty slots, is also provided by the present invention Finally, PCT Patent Publication No. WO 01/19,612 published on Mar. 22, 2001 to DSM N. V., titled "Information-Carrying Moulded Part," describes a card having laminations of different plastics, with information imbedded in the cards. The information which may be carried in the cards of the '612 PCT Patent Publication is not electronic, however. Rather, the Abstract discusses the placement of "an informative representation" and the use of "sublimation printing." In any event, no-disclosure of the attachment of a key, or any other article to the card is disclosed, and no drawings are provided to show any specific card configuration.

None of the above inventions and patents, taken either singularly or in combination, is seen to describe the instant invention as claimed. Thus a key control tag solving the aforementioned problems is desired.

SUMMARY OF THE INVENTION

The present invention comprises a key control tag, configured particularly for use with the key control system developed and marketed by Key-Trak, Inc. The Key-Trak, Inc. system is essentially as described in the Maloney '628 and '441 U.S. Patents, discussed further above, with Key-Trak, Inc. being the assignee in these two U.S. Patents, as well as in other Maloney patents. A description of the Maloney/Key-Trak, Inc. key control system (and the deficiency which the present invention cures) has been provided further above, particularly in the discussion of the Maloney '628 U.S. Patent which has been cited as related art.

A major problem with the Key-Trak, Inc. system is that the key tag slots are relatively wide, in order to provide clearance for the thickness of the "Dallas chip" type electronic button or device which is attached to the insertion end of each tag. Also, the tags provided with the Key-Trak, Inc. system are relatively thin and flexible, and when a number of keys are attached to the tag, their weight can cause the tag to bend to the point that the attached keys may fall into the gap between the edge of the key tag slot and the key tag itself, or perhaps into an adjacent slot. This is all the more so when many other commonly carried devices (e.g., remote control devices, pagers, etc.) are attached to a key ring, which is in turn secured to the Key-Trak, Inc. tag. Even if only a single key is secured directly to the key attachment end of the Key-Trak, Inc. tag, the open slots are still prone to the collection of various articles (e.g., staples, paper clips, etc.) therein.

This is a particular problem with electrically conductive objects, as in the cases of the examples given above. Such objects will short across the two electrical contacts within the slot, and the Key-Trak, Inc. system cannot accept relatively unimpeded electrical current across the contacts without major damage to the system. Rather, the Key-Trak, Inc. system is configured to provide a specific pulse code to each of the contact sets in the system, with the "Dallas chips" installed in the system, providing sufficiently high resistance to preclude damage to the system, in addition to their function as transponders to return specific codes indicating their placement in corresponding slots.

The present invention provides a solution to this problem by providing key control tags for use with the Key-Trak, Inc. system, which include a lateral flange or cover which extends outwardly from at least one of the flat surfaces of each tag. The flange is disposed generally medially between the electrical contact end of the tag, which is inserted into the slot of the Key-Trak, Inc. device, and the opposite end which is used to secure one or more keys or other objects thereto. The flange is relatively narrow, providing only sufficient width as to completely cover any otherwise remaining open gap or space between the surface of the tag and the edge of the slot. This allows any indica (letter—number identifications for the slots, etc.) to be read clearly, without obscuring them. The flange may extend to the opposite side of the tag as well, to a lesser degree, to cover the smaller gap opposite the primary thickness of the electronic device as it extends from the surface of the tag.

Another embodiment of the present invention comprises a relatively short blank tag, which has no provision for the installation of an electronic chip or device therein. These blanks are used to cover otherwise unused slots, to preclude dropping of any objects into otherwise open slots when there are an insufficient number of key tags in use to correspond to every slot in the device. The blank tags may be formed in a different shape and/or have a different color than the key tags, in order to avoid confusion between the two devices. Preferably, the blanks are not provided with a key attachment extension, as are the key tags.

All of the tags of the present invention are preferably molded of a relatively thick and durable, dense plastic material for greater strength, rather than being die cut from thin polystyrene, as are the Key-Trak, Inc. key control tags. The greater strength results in greater stiffness, which greatly reduces or obviates the problem of the weight of multiple keys bending the tags to the extent that the keys can drop into an adjacent slot in the Key; Trak, Inc. device and damage the device electrically. The improved key control tags of the present invention may be formed in any practicable size or length desired, but preferably are configured; in two different lengths in order to accommodate the two different drawer depths provided by Key-Trak, Inc.

Accordingly, it is a principal object of the invention to provide an improved key control tag which is compatible with the Key-Trak, Inc. key control system, and which provides coverage for the corresponding slots of the Key-Trak, Inc. system to preclude entry of foreign objects therein.

It is another object of the invention to provide a blank cover or cap device for installation in the Key-Trak, Inc. slots, to cover such slots where there are an insufficient number of in use key tags to fill each of the slots.

It is a further object of the invention to provide such key control tags and blanks or caps, which slot coverage means comprises a lateral flange disposed between the ends of the device, and extending across at least one, or both, of the opposite planar surfaces of the device.

Still another object of the invention is to form such key control tags and caps of relatively stiff, thick and dense plastic material, in order to substantially reduce or preclude bending due to the mass of multiple keys and/or other objects secured to the key attachment end of the tag.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a key control tag and blank configured for use with a Key-Trak, Inc. key security drawer system. This system has been described in general further above, and is disclosed in detail in the '628 and '441 U.S. Utility Patents to Maloney and assigned to Key-Trak, Inc., which patents have been discussed further above. Essentially, the Key-Trak, Inc. drawer contains a series of slots for accepting a corresponding series of key tags therein. Each slot has a pair of electrical contacts therein, with each key tag having an. electronic chip installed in its slot insertion end. The Key-Trak, Inc. system periodically queries each key tag slot position, with a response being provided by the electronic device of a key tag installed in any of the slots. The system thus "knows" whether any given key(s) are installed in or have been removed from the drawer, and the time(s) of their removal and replacement in the drawer.

The open slots of the Key-Trak, Inc. drawer, with their electrical contacts therein, present a potential problem, however. These open slots are prone to collecting various foreign objects therein (e.g., staples, paper clips, etc.), and the relatively flexible nature of the Key-Trak, Inc. tags can allow them to flex when a relatively massive group of keys or other articles are secured thereto, to allow the key(s) to drop into one of the slot passages. Costly damage to the system can occur when the contacts within a slot are shorted out by an electrically conductive object.

Figure 1:
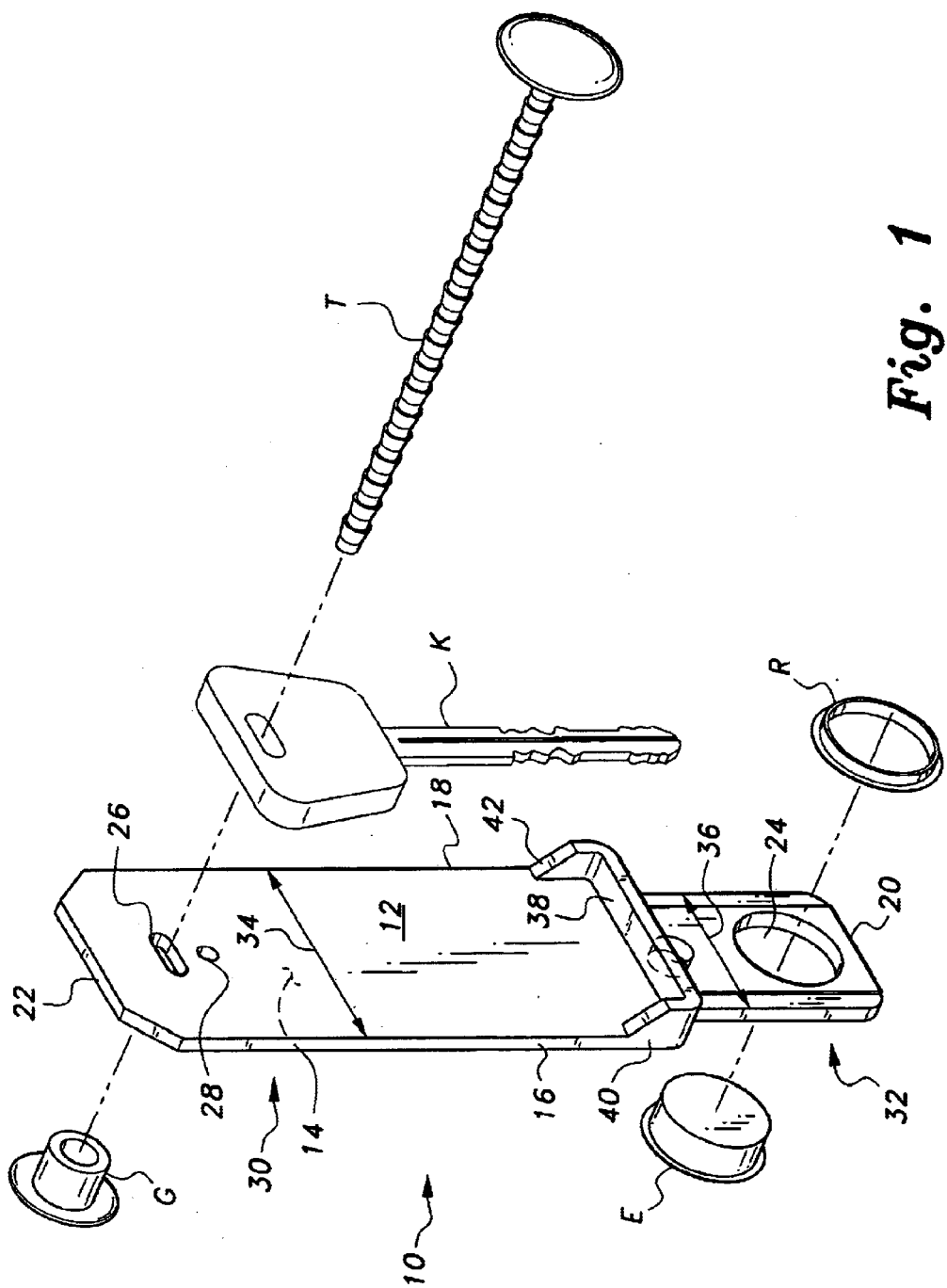
FIG. 1 is an exploded perspective view of a key control tag according to the present invention, showing details thereof and further showing the attachment of other devices thereto.

The present invention provides a solution to the above problem, with a specially configured key tag and blank for covering otherwise unused and open slots in the Key-Trak, Inc. drawer. FIG. 1 illustrates a key control tag assembly of the present invention. The key tag 10 of the present invention is formed of a relatively stiff sheet of high density plastic material, to provide greater strength and resistance to bending than the Key-Trak, Inc. key tags. The present key tag 10 is preferably injection molded of a high density polyethylene material, rather than being die cut from a thinner and more flexible sheet of polystyrene, as in the Key Trak, Inc. tags. This provides numerous advantages for the present key control tag 10, as the molds may be configured to provide somewhat greater thickness (to the limits defined by the sides of the Key-Trak, Inc. drawer slots) and thus greater strength.

The key control tag 10 comprises a relatively flat sheet of material having a first surface 12, an opposite second surface 14, a first edge 16, an opposite second edge 18, an electronic device attachment end 20, and an opposite key or article attachment end 22. The electronic device attachment end 20 includes a passage 24 therethrough, configured for the installation of an electronic transponder device E therein. The Key-Trak, Inc. system uses an "iButton" manufactured by Dallas Semiconductor, and the present key control tag 10 is preferably configured to fit that type of device. The electronic device E is secured by a retaining ring R. However, the electronic device passage 24 may be configured for the installation of other types of electronic devices, if desired.

The opposite key or article attachment end 22 includes at least one key or article attachment passage 26 formed therethrough, and may have a secondary article attachment passage 28, if desired. This provides additional versatility for the numerous keys and electronic devices (remote door openers, pagers, etc.) carried by many people. Preferably, the key or article attachment portion 30 of the key control tag 10 extending above the slot of the Key-Trak, Inc. drawer, is somewhat wider than the slot insertion portion 32 of the tag 10, which has the electronic device passage 24 therein. The narrower width 36 of the slot insertion portion 30, is configured to fit the Key-Trak, Inc. drawer slots. The shoulders provided by the wider width 34 of the key attachment portion 30 serve as stops to preclude excessive penetration of the narrower slot insertion portion 32 into the Key-Trak, Inc. drawer slot.

Figure 2:
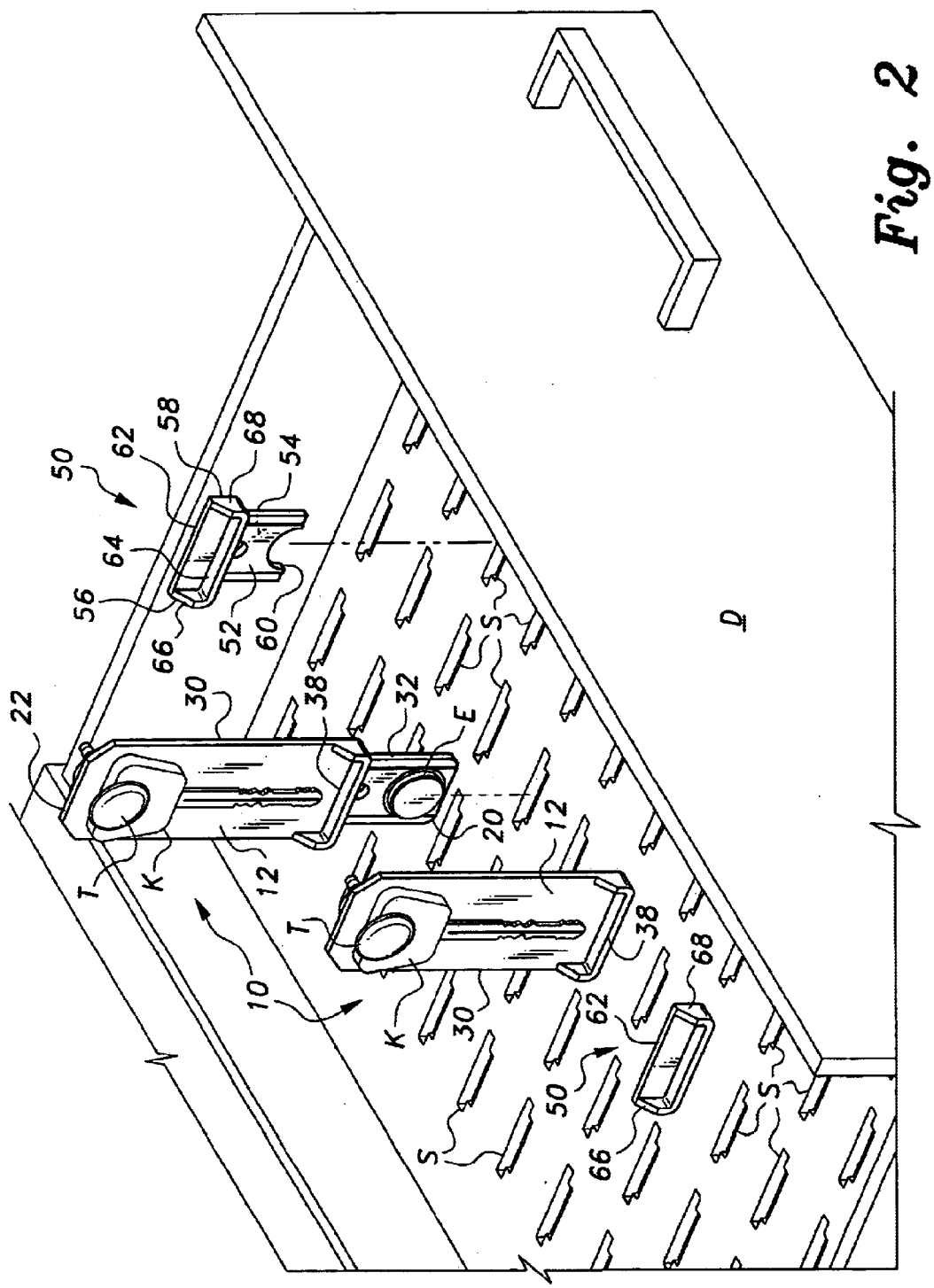
FIG. 2 is a fragmented, exploded perspective view of a portion of a Key-Trak, Inc. key control drawer, showing the installation of a key control tag and blank of the present invention, therein.
Figure 3:
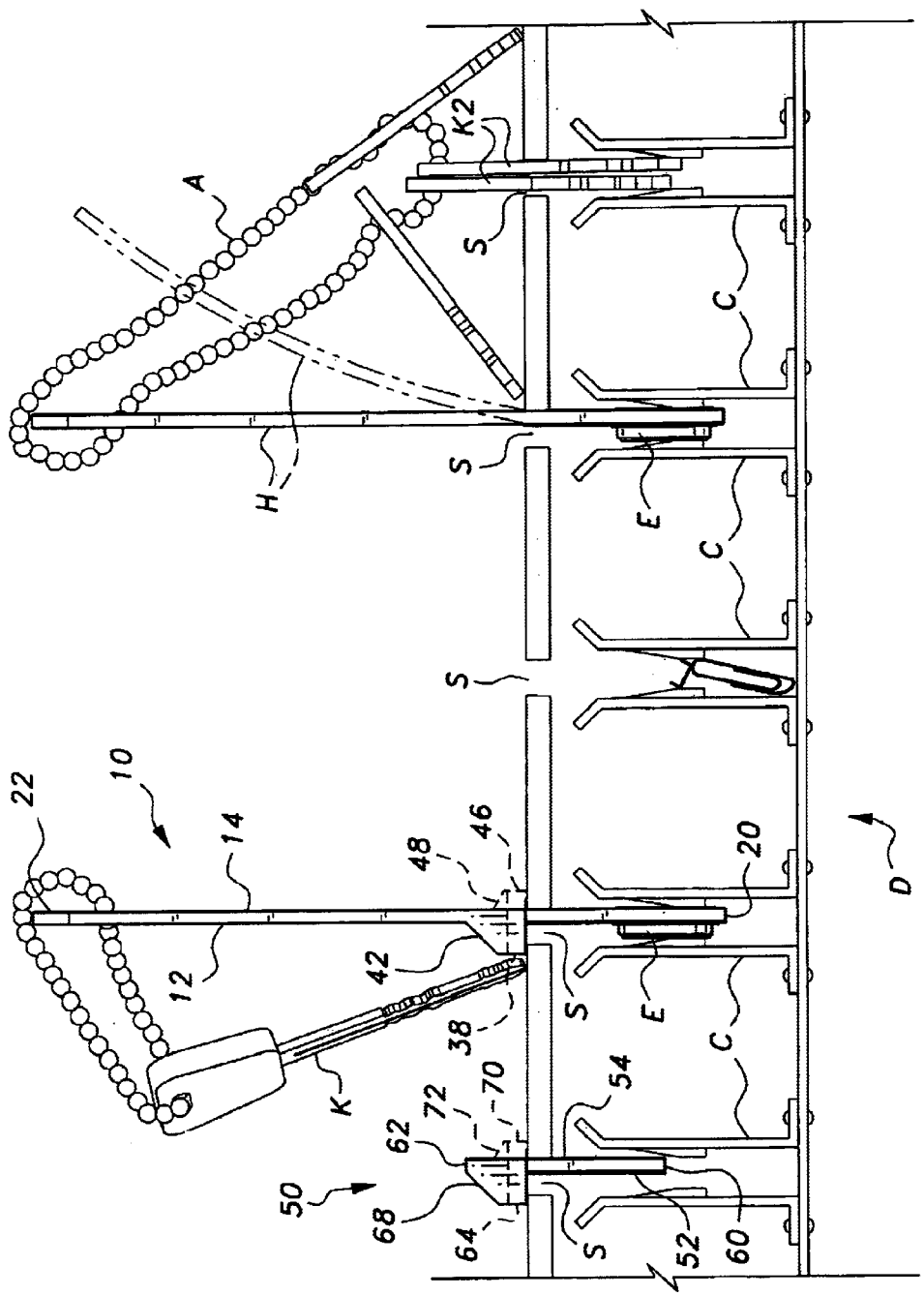
FIG. 3 is an elevation view in section of a portion of a Key-Trak, Inc. key control drawer, showing the problems arising with prior key tags and the solution provided by the present invention.

A lateral flange 38 extends outwardly from the first surface 12 of the key tag 10, between the key attachment and electronic device installation portions 30 and 32 thereof, and completely across the width 34 of the key attachment portion 30 from edge to edge thereof. This flange 38 serves as a cover over the otherwise open portion of the Key-Trak, Inc. drawer slot into which the key control tag 10 is inserted, as shown in FIGS. 2 and 3 and discussed further below. The flange 38 is essentially normal to the plane defined by the planar sheet of material which forms the balance of the tag 10, and is reinforced by opposite first and second end gussets 40 and 42, which extend between each end of the flange 38 and the corresponding sheet edge 16 and 18.

A key K (and/or other article, as desired) may be secured through the hole or passage 26 and/or 28 formed in the key or article attachment end 22 of the tag 10, by means of a flexible plastic rivet or tie T and retaining grommet G. Other key or article attachment means may be used alternatively as desired, e.g., keychains, Nylon or plastic loop ties, etc. The key K (or other article) is relatively loosely attached, so it may pivot about its attachment tie T for storage along the key attachment portion 30 of the device, or may be pivoted to extend therefrom for use as required. Another hole or passage 44 may be provided between the electronic device installation hole or passage 24 and the slot cover flange 38, to serve as a hanging hole for hanging the key control tag 10 from a hook or other hanger, if so desired.

FIGS. 2 and 3 illustrate the placement of the present key control tags in the slots S of a Key-Trak, Inc. key control drawer, D. It will be noted that the slots S each have a somewhat wider central area, in order to provide clearance for the thickness of the electronic device E installed in the slot insertion end portion of the key tag. The slot cover flange 38 of the present key control tag 10, serves to completely cover this wider portion of the slot S when the present tag 10 is installed therein, as is clear from the leftmost key control tag 10 of FIGS. 2 and 3, shown fully installed within their corresponding slots S. The cover flange 38 precludes the entry of any keys K and/or other foreign objects into the slots S, where they would short out the electrical contacts C within the slots S, as shown in FIG. 3.

It will be noted that the slots S may have some slightly wider area to the opposite side of the electronic device clearance area, in order to provide clearance for the back side or portion of the electronic device E, which protrudes slightly from the second surface 14 of the tag 10. While the space or gap between this edge of the slot S and the second surface 14 of the tag 10 is relatively small, it may still be sufficiently wide as to allow a staple, pin, or similar small metal object to fall into the slot and short out the contacts C therein. Accordingly, a smaller or narrower secondary slot cover flange 46 may be added to extend laterally from the second surface 14 of the tag 10, directly opposite the first slot cover flange 38. This optional secondary slot cover flange 46, with its gussets 48, is shown in broken lines in the side elevation view of FIG. 3.

It will be appreciated that there will not necessarily be al one-to-one correspondence between the number of slots S within the key control drawer D, and the number of keys K or other articles which need to be tracked or secured. Thus, many of the slots S within a drawer D, may remain open, with some risk of foreign object entry therein, as noted further above. One solution would be to place one of the present key control tags 10 in each slot S of the drawer D, thereby assuring that all slots S are covered. However, this is somewhat wasteful, and can be confusing when searching for a specific key and key control tag, which would have an identical appearance excepting the installation of a key or other object thereon.

Accordingly, the present invention may include a tag blank 50 for covering any otherwise open slots S. Such tag blanks 50 are shown in FIGS. 2 and 3, and comprise a plastic sheet having a first surface 52, an opposite second surface 54, a first edge 56, an opposite second edge 58, a socket insertion end 60, and an opposite grip end 62. The essential difference between the tag blanks 50 and the key tags 10 is that the tag blanks 50 are shortened at both ends, with the key attachment portion removed to provide a short grip end portion 62 and the electronic device attachment end portion 60 shortened as well, as there is no need for an electronic device with the blanks 50. Preferably, the blanks 50 are formed of a durable plastic material, such as the high density polyethylene material of which the key control tags 10 of the present invention are made, although other materials may be substituted as desired.

A lateral slot cover flange 64 extends outwardly from the first surface 52 of the tag blank 50, separating the grip end portion 62 from the slot insertion end portion 60, and extends completely across the width of the grip end portion 62 from edge to edge thereof. This flange 64 serves the same function as the slot cover flange 38 of the key tag 10, as a cover over the otherwise open portion of the Key-Trak, Inc. drawer slot into which the key control tag 10 is inserted. The flange 64 is essentially normal to the plane defined by the planar sheet of material which forms the balance of the tag blank 50, and is reinforced by opposite first and second end gussets 66 and 68, which extend between each end of the flange 64 and the corresponding grip edge 56 and 58.

The tag blanks 50 are inserted into the corresponding slots S as desired, in the same manner as that used for installing the key control tags 10. It will be noted that the grip portions 62 of the tag blanks 50, with their slot cover flanges 64 extending outwardly therefrom, are somewhat wider than the relatively narrower slot insertion end portions 60, in the manner of the key tags 10. This provides a shoulder to each side or edge 56 and 58 of the tag blank 50, which in addition to the slot cover flange 64, act as stops tot preclude excessive penetration of the tag blank 50 into the corresponding slot S.

FIG. 3 provides a side elevation view in section of a Key-Trak, Inc. drawer D with exemplary installations of the present key control tag 10 and tag blank 50 therein, as well as an illustration of an earlier key holder tag H of the prior art and the problems associated with such holders H. As in the case of the key tag 10, the tag blank 50 may also include a secondary slot cover flange 70 extending from its second surface 54. A pair of secondary gussets 72 may be provided between the edges of the grip portion 62 and the flange 70, for reinforcement of the flange 70. The provision of a relatively smaller secondary flange 70 for the tag blank 50 serves the same purpose as that of the secondary flange 46 of the key control tag 10, i.e., to provide complete coverage or closure for the slot S in which the device is installed, to preclude entry of any foreign objects therein which might short out the internal electrical contacts and damage the system.

In contrast, the completely flat, planar plastic sheet from which the key holder H is cut, leaves a gap between the edge of the slot S and the holder H surface. This can allow foreign matter to enter the slot, and if the foreign object is conductive (e.g., the end of a key, etc.), it can short out the contacts C in the slot and damage the system, even though an electronic device E is placed between the contacts. There are various means by which such keys may fall into one of the slots S of the Key-Trak, Inc. drawer D. For example, if relatively long key chains A are used to secure a set of keys K2 to the key holder H, as shown to the right side of FIG. 3, the keys K2 may drop downwardly into an adjacent slot and short out the contacts C therein. Alternatively, the installation of a relatively large mass of keys, and/or installation of a relatively heavy object (e.g., pager, remote controller or switch device, etc.) on the thin and flexible key holder H, can cause the holder H to flex over (as shown in broke lines) to the extent that keys K2 attached thereto can enter an adjacent slot S.

Another problem with the Key-Trak, Inc. slots is that any foreign matter of sufficiently small size, can easily fall into the slots S when they are uncovered, even if steps are taken to install the improved key control tags 10 of the present invention in other slots S. The tag blanks 50 illustrated in FIGS. 2 and 3 and discussed further above, obviate this problem. Thus, the present key control tags 10, particularly when combined as a kit with the tag blanks 50, protect the slots S of the Key-Trak, Inc. system to assure its reliable operation.

In conclusion, the present key control tags and tag blanks serve to greatly increase the reliability and reduce maintenance and repair costs for the Key-Trak, Inc. system which is widely used for the control of large numbers of keys and similarly sized objects in various environments. The present key control tags may be made in any practicable length, from relatively short lengths to fit lower height drawers, to taller lengths as desired. The same also applies to the tag blanks as well. The present invention is particularly well suited for use by automobile dealerships, where large numbers of car keys are regularly handled by sales staff, maintenance personnel, and others as required. As an additional reminder for such an environment, the key control tags may be imprinted with the phrase, "Dealership Property—Please Return," or a similar or equivalent phrase. However, the improved key control tags of the present invention are also valuable in other industries or fields as well, such as automobile and equipment rental agencies, apartment complexes for spare keys for maintenance and security personnel, personal storage complexes, and other situations where large numbers of keys must be controlled. Wherever the present key control tags and tag blanks are used, they will serve to greatly reduce the maintenance and repair costs for the Key-Trak, Inc. system with which they are used, thereby reducing the operating costs of the associated business.

It is to be understood that the present invention is not limited to the embodiments described above, but encompasses any and all embodiments within the scope of the following claims.

I claim:

1. A key control tag kit, comprising:
   a key control tag, the tag being a stiff sheet of plastic material having a first surface, a second surface opposite said first surface, an electronic device attachment end, and a key attachment end opposite said electronic device attachment end;
   a tag blank, the blank being a sheet of plastic material having a first surface, a second surface opposite said first surface, a socket insertion end, and a grip end opposite said socket insertion end;
   said key control tag having a lateral flange defining a key tag drawer slot cover, extending outwardly from said first surface of said sheet between said electronic device attachment end and said key attachment end thereof;
   said tag blank having a lateral flange defining a key tag drawer slot cover, extending outwardly from said first surface of said sheet between said socket insertion end and said grip end thereof;
   an electronic device installation passage defined through said electronic device attachment end of said key control tag; and
   at least one key attachment passage defined through said key attachment end of said key control tag.

2. The key control tag kit according to claim 1, wherein:
   said sheet of said key control tag between said key attachment end and said flange is wider than said electronic device attachment end of said key control tag; and
   said grip end of said tag blank is wider than said socket insertion end of said tag blank.

3. The key control tag kit according to claim 1, wherein:
   said lateral flange of said key control tag is substantially normal to said sheet thereof; and
   said lateral flange of said tag blank is substantially normal to said sheet thereof.

4. The key control tag kit according to claim 1, further including:

a secondary lateral flange disposed upon said second surface: of said key control tag, opposite said lateral flange of said first surface of said key control tag; and a secondary lateral flange disposed upon said second surface of said tag blank, opposite said lateral flange of said first surface of said tag blank.

5. The key control tag kit according to claim 1, further including:

a first edge and a second edge opposite said first edge, disposed along said key control tag;

a first edge and a second edge opposite said first edge, disposed along said tag blank;

said lateral flange of said key control tag extending completely across said first surface of said key control tag, from said first edge to said second edge thereof;

said lateral flange of said tag blank extending completely across said first surface of said tag blank, from said first edge to said second edge thereof;

a first and a second gusset disposed respectively between said first edge and said second edge of said key control tag, and said lateral flange thereof; and a first and a second gusset disposed respectively between said first edge and said second edge of said tag blank, and said lateral flange thereof.

6. The key control tag kit according to claim 1, wherein said plastic material of said key control tag and of said tag blank comprises high density polyethylene.

7. A key control tag comprising:

a stiff sheet of plastic material having a first surface, a second surface opposite said first surface, an electronic device attachment end, and a key attachment end opposite said electronic device attachment end;

a lateral flange defining a key tag drawer slot cover extending outwardly from said first surface of said sheet between said electronic device attachment end and said key attachment end thereof;

an electronic device installation passage defined through said electronic device attachment end of said sheet; and at least one key attachment passage defined through said key attachment end of said sheet.

8. The key control tag according to claim 7, wherein said sheet between said key attachment end and said flange is wider than, said electronic device attachment end of said sheet.

9. The key control tag according to claim 7, wherein said lateral flange is substantially normal to said sheet.

10. The key control tag according to claim 7, further including a secondary lateral flange disposed upon said second surface of said sheet, opposite said lateral flange of said first surface of said sheet.

11. The key control tag according to claim 7, further including:

a first edge and a second edge opposite said first edge, disposed along said sheet;

said lateral flange extending completely across said first surface of said sheet, from said first edge to said second edge thereof;

a first gusset disposed between said lateral flange and said first edge of said sheet; and a second gusset disposed between said lateral flange and said second edge of said sheet.

12. The key control tag according to claim 7, further including a hanging hole disposed between said electronic device attachment passage and said lateral flange of said sheet.

13. The key control tag according to claim 7, wherein said plastic material of said sheet comprises high density polyethylene.

14. A key control tag assembly, comprising:

a stiff sheet of plastic material having a first surface, a second surface opposite said first surface, an electronic device attachment end, and a key attachment end opposite said electronic device attachment end;

a lateral flange defining a key tag drawer slot cover extending outwardly from said first surface of said sheet between said electronic device attachment end and said key attachment end thereof;

an electronic device installation passage defined through said electronic device attachment end of said sheet;

an electronic device installed within said electronic device installation passage;

at least one key attachment passage defined through said key attachment end of said sheet; and at least one key attachment fastener installed through the corresponding at least one key attachment passage.

15. The key control tag assembly according to claim 14, wherein said sheet between said key attachment end and said flange is wider than said electronic device attachment end of said sheet.

16. The key control tag assembly according to claim 14, wherein said lateral flange is substantially normal to said sheet.

17. The key control tag assembly according to claim 14, further including:

a first edge and a second edge opposite said first edge, disposed along said sheet;

said lateral flange extending completely across said first surface of said sheet, from said first edge to said second edge thereof;

a first gusset disposed between said lateral flange and said first edge of said sheet; and a second gusset disposed between said lateral flange and said second edge of said sheet.

18. The key control tag assembly according to claim 14, further including a secondary lateral flange disposed upon said second surface of said sheet, opposite said lateral flange of said first surface of said sheet.

19. The key control tag assembly according to claim 14, further including a hanging hole disposed between said electronic device attachment passage and said lateral flange of said sheet.

20. The key control tag assembly according to claim 14, wherein said plastic material of said sheet comprises high density polyethylene.

* * * * *